(12) United States Patent
Stier

(10) Patent No.: US 8,103,633 B2
(45) Date of Patent: Jan. 24, 2012

(54) METHOD AND SYSTEM FOR GENERIC DISPLAY AND USE OF AN OBJECT

(75) Inventor: Andreas Stier, Malsch (DE)

(73) Assignee: SAP AG, Walldorf ( * ) Notice: Subject to any disclaimer, the term of this patent is extended or adjusted under 35 U.S.C. 154(b) by 311 days.

(21) Appl. No.: 11/618,514

(22) Filed: Dec. 29, 2006

(65) Prior Publication Data

US 2008/0163170 A1 Jul. 3, 2008

(51) Int. Cl.
*G06F 17/00* (2006.01)

(52) U.S. Cl. ........ 707/649; 707/634; 707/644; 707/647; 707/653; 707/661

(58) Field of Classification Search .................. 707/649, 707/634, 644, 647, 653, 661
See application file for complete search history.

(56) References Cited

U.S. PATENT DOCUMENTS

| | | | | |
|---|---|---|---|---|
| 6,678,809 B1 * | 1/2004 | Delaney et al. | ............... | 711/162 |
| 6,820,099 B1 * | 11/2004 | Huber et al. | ................... | 707/204 |
| 2006/0235831 A1 * | 10/2006 | Adinolfi et al. | ................... | 707/3 |

* cited by examiner

*Primary Examiner* — Sana Al Hashemi
(74) *Attorney, Agent, or Firm* — Kenyon & Kenyon LLP

(57) ABSTRACT

A method and system for obtaining past information in a generic manner. For a certain time point, obtaining a copy of the process object, including its structure and data from recorded changes. When setting up the process object, an action rule is associated with the process object to automate that any change in the data content and/or structure is recorded with an associated time of the change. In response to a request for past information, steps are taken to acquire past data, acquire past change data, and create a temporary object to simulate the object that would have existed at the specific time requested.

9 Claims, 5 Drawing Sheets

Associate action rule with process object to automate that any change in the content or structure is saved with an associated time unit of the change
500

Determine underlying structure and content of an object
510

Derive the object structure that was current at a specific time point from the change document of the object structure recorded
520

Create a temporary object structure to include the data selected in the immediately following change document for each field of the object structure that was current at the specific time point
530

Assign old data from the selected change document(s) to the corresponding field(s) in the temporary object
540

Display the values of the filled in object for the specific time point
550

Fig. 5

METHOD AND SYSTEM FOR GENERIC DISPLAY AND USE OF AN OBJECT

BACKGROUND

A process object is an object in a computer system that describes the structure and behavior of a business process. As such, the process object may include data, logic, and structures. The process object may have data and routines to manipulate the data, as in object-oriented objects, and structures, e.g., database tables, to describe the relationships (or associations) with other process objects, as in relational database objects. In a system, these process objects are generally the core structuring components to encapsulate the functionalities that applications need to implement business processes. Each process object advantageously provides a discrete representation of the structure and behavior of a business process. An application to implement a business process may then advantageously access the appropriate process objects and their data, without having to know the details of the underlying implementation.

This process object encapsulates the business process' functionality within the object itself (and, in some cases, in other entities referenced by the object), defines relationships between different components and process objects, and provides the basic building block for applications. This process object encompasses traditional objects as well as object-oriented business objects. This means that the process object encapsulates and/or defines functionality at a high level by referring to the business modules that provided the functionality. The business modules are the basic building blocks for applications. The process object also may include structural information about the object's relationships.

Process objects are generally the core structuring components in a system. In situations where a user needs to see the past content history, it would be useful if the process objects were designed to maintain certain time information to assist in viewing different data during the lifetime of the matter being modeled.

Available tools, e.g., those effecting change documents, are not effective to assist in viewing past history because they are set to show, e.g., only the singular change made, not to show the complete object. Events, for example, may include creation, modification, changes, and/or deletions to content and/or structure of an object. The available change documents only enable logging at a field level of all changes to an object. In available change documents, one cannot determine the full content of the object at a specific time point in the past. Further, the object can still be subject to structural changes that are time dependent which is not taken into account by present change documents. Thus, at various times in the past the object may have had different structures and/or different content. And, with existing methods and functions, a determination and display of the content of an object can require a large amount of time-consuming research and manual effort.

Accordingly, there is a need in the art for an effective way to maintain and access past history of an process object to provide for viewing past events and/or modifications at specific time points.

BRIEF DESCRIPTION OF THE DRAWINGS

FIG. 5 is a flowchart of a method in accordance with an embodiment of the present invention.

DETAILED DESCRIPTION

Figure 1:
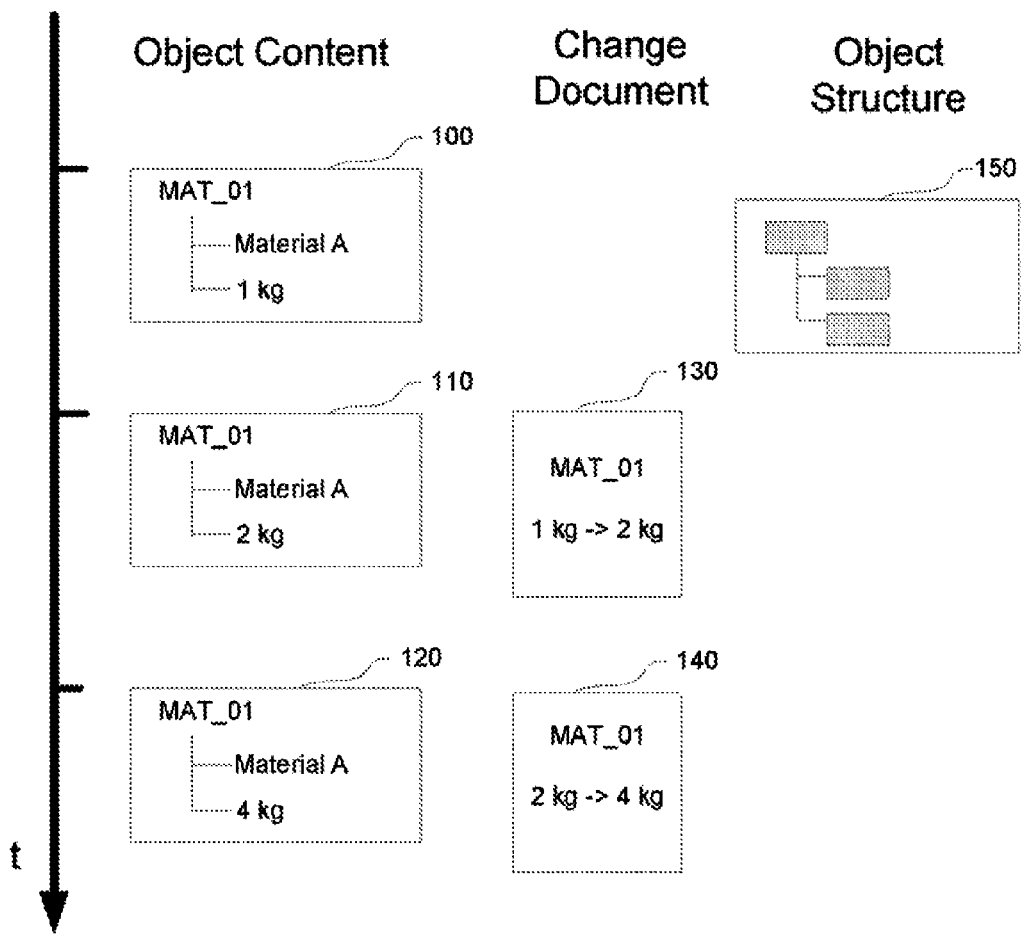
FIG. 1 is a diagram showing an example of a change in the content of a complex object in accordance with an embodiment of the present invention.

Embodiments of the present invention include a method, a function, a system, and an apparatus to handle both content and structure features or attributes of a complex object, or software object. A software object may be what is the traditionally considered object, a complex object, a business object, a process object, an object having data and structure, etc. Available change documents and the like only log changes to a complex object at field level and do not display the full content of an object at a point in time in the past while taking into consideration the object structure. Embodiments of the present invention may display and take into account the full content of an object at a point of time, while taking into consideration the object structure. A system in accordance with an embodiment of the present invention may include a memory to store the process objects and change data, a processor to evaluate the object data, object change data, routine (s), and relationship(s). The processor may select certain object change data to evaluate a change in object content and/or structure at a certain point in time. The system may include a clock and/or incremental-unit-keeping device to provide points in a time continuum to the processor. The processor then may evaluate the change data to provide data and/or requested results. A system also may include a user interface to display data and/or requested results from the processor.

Selection of the change data may be made in various ways. For example, the processor may receive selections from the user for, e.g., a specific date, point in time, and/or event. Or the processor may identify or calculate certain properties of or information about the process objects and then select the point in time based on the identification or calculation, e.g., from a look-up table having predefined events to track, of a change, or a particular type of change. A report and/or communication could then be generated manually or automatically by the processor (i.e., computing processor, user, etc.). Any other way may be used that is capable of selecting the desired point in time or points in time to use to determine the content and structure of a document, data, or process object in accordance with an embodiment of the present invention.

Embodiments of the present invention may determine the current underlying object structure. Embodiments of the present invention may derive the object structure that was current at a specific point in time to be displayed.

Embodiments of the present invention may create a temporary object structure to include selected data. For example, a user may select the immediately previous change document for each field of the object structure that was current at the point in time to be displayed. The starting point for this is the point in time to be displayed. And, if no change information is available, then the current value is used. Or, for example, a user may select an immediately following change document for each field of the object structure that was current at the point in time to be displayed. The starting point for this is the point in time to be displayed. And, if no change information is available, the current value at that point in time is used.

Embodiments of the present invention may then assign new or old data from the selected change documents to the corresponding fields in the temporary objects, based on the selected data. In further embodiments, the value(s) of the filled object may be displayed.

Embodiments of the present invention may be used in any documents, data files, etc. in which a change history is desired. For example, embodiments of the present invention may be useful for product development tracking and review, customs documents, long term vendor declarations, bills of materials, sanctioned party list screening, etc.

Embodiments of the present invention enable the determination and display in a signal processing step of a complex object at any point in time in the past with all values and taking into consideration the object structure that existed at the point in time to be displayed.

Embodiments of the present invention provide for an essentially automatic method to determine past history at specific time points for a document or other data file, more efficient use of processing time, elimination of user-dependent interpretations of what was past values and structures of a document or other data file, and/or reduced development effort since display and programming are generic and can be used for different contexts.

Embodiments of the present invention may be used in all areas that log changes to objects at a data field level using change documents. These areas include, for example, objects such as products, numbering schemes, and documents.

In embodiments of the present invention, one may determine the current underlying object structure. Embodiments of the present invention may involve rebuilding past structures of an object, and displaying the results. Embodiments of the present invention may allow the display for changes in content, e.g., from 1 kg to 2 kg.

FIG. 1 shows an embodiment involving change in object content of the present invention. An object MAT_01 may contain test material, and the value 1 kg (of the test material) 100. The object MAT_01 has an object structure of two attributes 150. The object MAT_01 may later be modified so that there is a value of 2 kg (of the test material) represented 110. A change document is stored which shows at a specific point in time that there was a change in the MAT_01 object content from 1 kg to 2 kg 130. The object MAT_02 may later be modified so that there is a value of 4 kg (of the test material) represented 120. Another change document—in addition to the earlier change document—is stored to indicate a change in the MAT_01 object content from 2 kg to 4 kg 140. Since, an attribute of the object MAT_01 was modified, this is considered a change in content of the object MAT_01. No attributes of MAT_01 were removed or added after the original MAT_01 object was created, so there was no change in the object structure 150.

Figure 2:
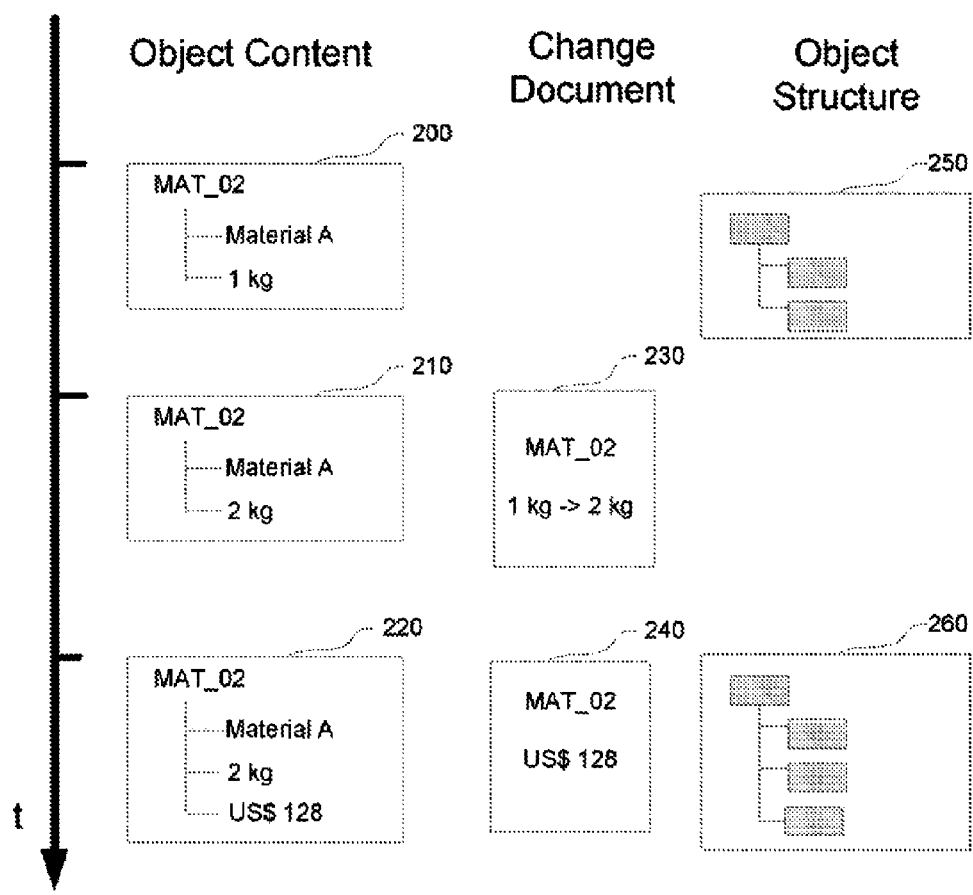
FIG. 2 is a diagram showing an example of change in the content and structure of a complex object in accordance with an embodiment of the present invention.

FIG. 2 shows an embodiment involving change in object content and structure of the present invention. An object MAT_02 may contain test material, and the value 1 kg (of the test material) 200. The object MAT_02 has an object structure of two attributes 250. The object MAT_02 may later be modified so that there is a value of 2 kg instead of 1 kg (of the test material) represented 210. A change document is stored which shows at a specific point in time that there was a change in the MAT_02 object content from 1 kg to 2 kg 230. Since there was no change in object structure, no record for the structure is saved in addition to the original structure. The object MAT_02 may later be modified so that all attribute remain as is, however, a new attribute of US$ 128 is added to the object 220. Another change document—in addition to the earlier change document—is stored to indicate a change in the MAT_02 object content of US$ 128. And, since an attribute or content was added, this is considered a change in content and structure of the object MAT_02. The change in structure of MAT_02 may then be saved for future reference to indicate the addition of an attribute or content.

Embodiments of the present invention may keep track of both structure and content of complex objects, and also of changes in structure and content. The present invention may be used in a variety of situations where a change in structure and/or content known at a specific point of time is desired. For example, for customs purposes, oftentimes the customs officials will meet with a company at its location to determine the status of goods at a specific time point. In the past, companies needed to manually search through documents to determine the exact status—both in content and in structure—of the goods at a particular time by manually checking and comparing documents. In the present invention, a company need only access the saved change documents of the object content changes and the object structure changes to present the status to a customs official and/or other requester so that the appropriate value for customs may be paid. Further, specifically for customs purposes, special codes are maintained to indicate the level of duty required for a specific country. Further, the codes for each country may change over time, or the product itself may change in value requiring a different customs code. The code for customs may be saved as a content attribute of the object. And, in accordance with the present invention, any change in the code attribute will be recorded at the associated time point. That way, customs may be handled based on the recorded code at the appropriate time desired by customs officials. Thus, embodiments of the present invention provide for an easily-accessible, efficient method to support the determination of customs duties and other business information, e.g., for tax purposes, or litigation purposes, etc.

In another example, a manufacturing company selling firefighter uniforms may store each piece as an object in its system. The attributes or content for each object are also stored, and any changes in the attributes' content and/or structure are recorded with respect to time points. This way, the manufacturing company may show to necessary entities that the uniform pieces are compliant with the (possibly changing) US law at specific points in time. This showing is effected essentially with the click of a button using a computer in accordance with the present invention. In the past, this was not possible.

Figure 3:
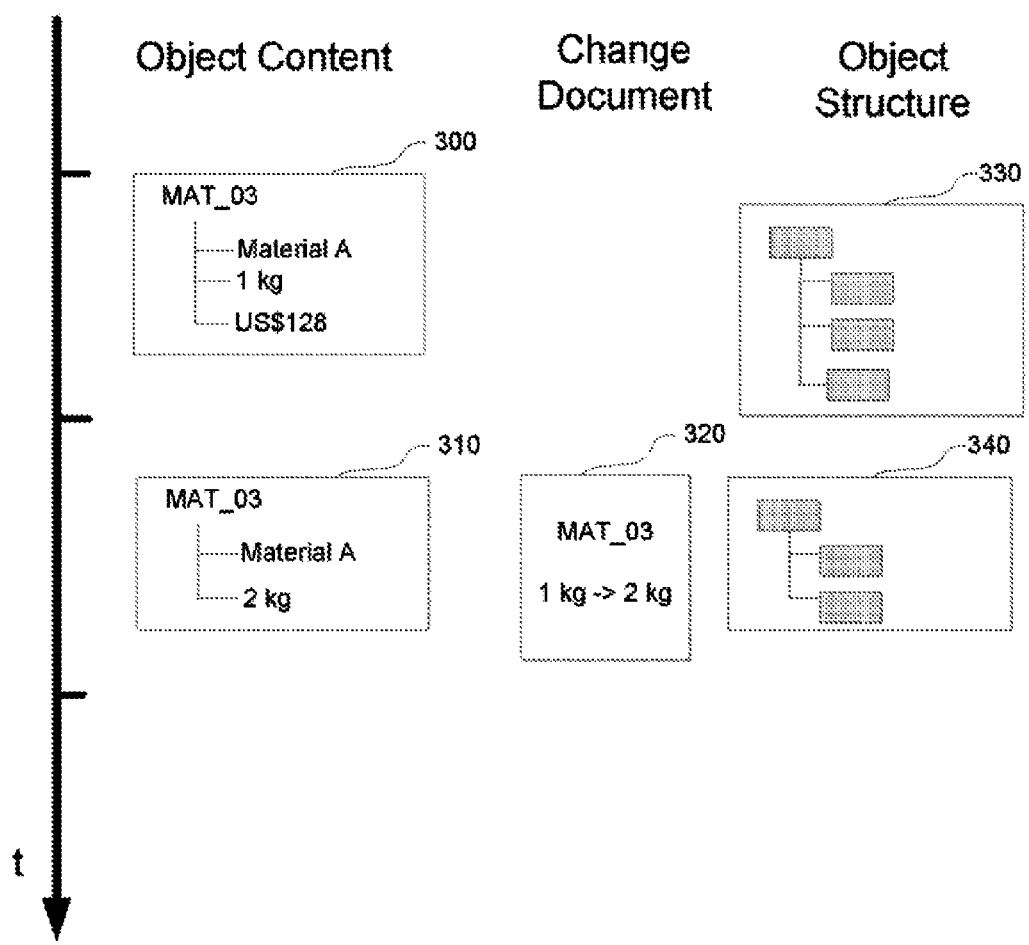
FIG. 3 is a diagram showing an example of change in the content and structure of a complex object in accordance with an embodiment of the present invention.

FIG. 3 shows an embodiment involving change in object content and structure of the present invention. An object MAT_03 may contain test material, the value 1 kg (of the test material), and a price value of US$ 128 300. The object MAT_03 has an object structure of two attributes or features 330. The object MAT_03 may later be modified so that there is a value of 2 kg instead of 1 kg (of the test material) represented, and the price value of US$ 128 may be removed 310. A change document is stored which shows at a specific point in time that there was a change in the MAT_03 object content from 1 kg to 2 kg 320. Change of the object structure is stored to indicate a change in the MAT_03 object structure due to the removal of the attribute or content price value of US$ 128 340. The change in structure of MAT_03 may then be saved for future reference to indicate the removal of an attribute of the object.

In an embodiment of the present invention, the change documents are automatically saved or recorded. Thus, the system is not dependent upon a user manually saving a new draft of an entire document. If a user were to manually save new drafts of a document every time there is a change, this manual method will require large and expensive increase in memory capabilities, additional time consumption, and/or lack of efficiency. Further, the appropriate document corresponding to the desired time point may be difficult to manually search for in the system. Instead, the generic structure of the object provides an efficient and versatile method and system for recording changes in object structure and content and their associated time points.

Figure 4:
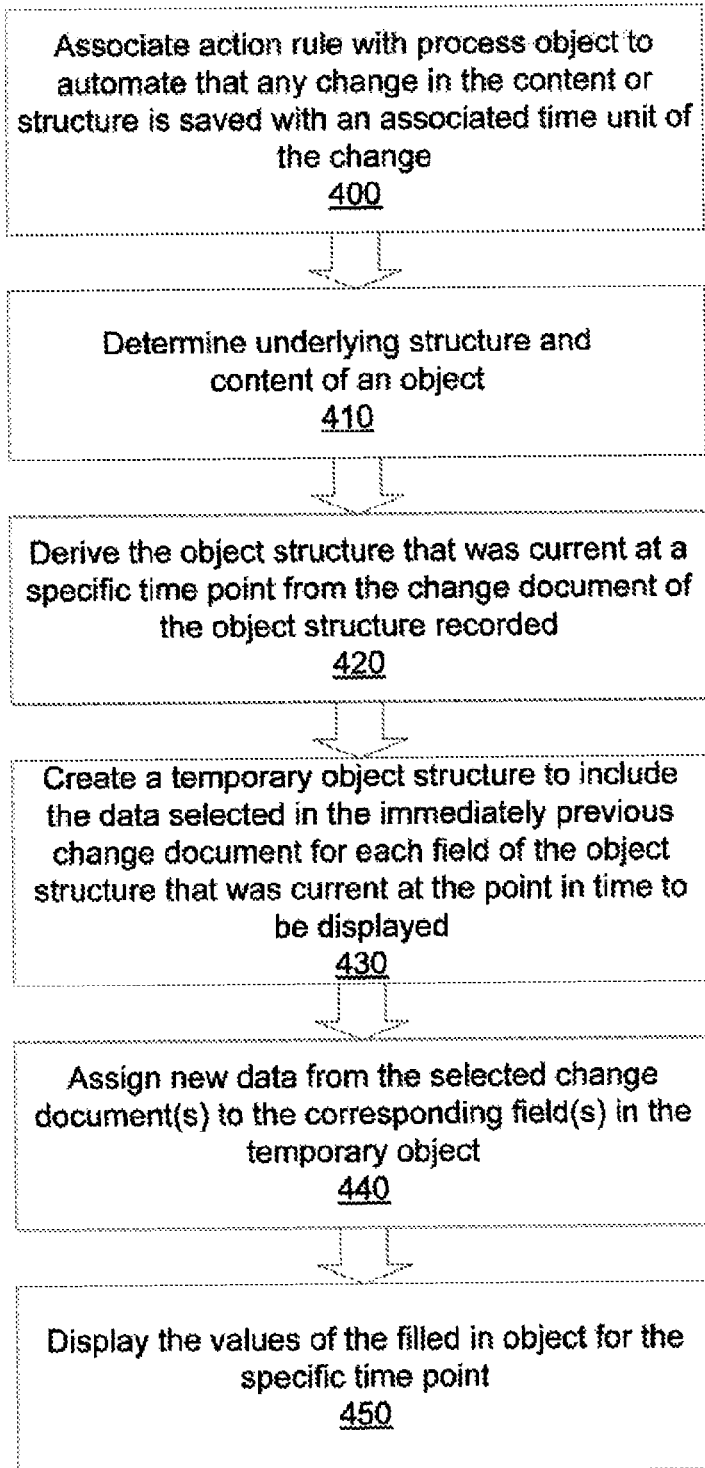
FIG. 4 is a flowchart of a method in accordance with an embodiment of the present invention.

FIG. 4 shows a flowchart illustrating an example method according to the present invention. When an object is created or determined, an action rule (e.g., the change is recorded) is associated with the object to automate that any change in the object content or structure is saved and the associated time of the change 400. The underlying structure and content of an object should be determined 410. The object structure that was current at a specific time point may be derived from the recorded object structure 420. A temporary object structure should be created to include the data selected in the immediately previous change document for each field of the object structure that was current at the point in time to be displayed 430. The start point is the time to be displayed. If no change document is available for a field, the current value is used. The new data from the selected change document(s) are then assigned to the corresponding fields in the temporary object 440. And, a display of the values of the filled object(s) for the specific time point may then be made 450.

FIG. 5 shows a flowchart illustrating an example method according to the present invention. When an object is created or determined, an action rule is associated with the object to automate that any change in the object content or structure is saved and the associated time of the change 500. The underlying structure and content of an object should be determined 510. The object structure that was current at a specific time point may be derived from the recorded/saved/stored object structure 520. A temporary object structure should be created to include the data selected in the immediately following change document for each field of the object structure that was current at the point in time to be displayed 530. The start point for this is the time to be displayed. If no change document is available for a field, the current value is used. The old data from the selected change document(s) are then assigned to the corresponding fields in the temporary object 540. And, a display of the values of the filled object for the specific time point made then be made 550.

The network connecting the computer components of a system according to the present invention may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software may be written in any programming language, such as ABAP, C, C++, XML, Java or Visual Basic. In various embodiments, application software embodying the functionality of the present invention may be deployed on a standalone machine or device, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the claims without departing from the spirit and intended scope of the invention.

What is claimed is:

1. A system comprising:
   a display;
   a processor; and
   a computer-readable storage medium having stored thereon:
      a software object comprising data content and structure content, wherein the structure content represents a structure of the software object;
      a plurality of change documents representing a history of changes made to data content and the structure of the software object, wherein each of said change documents is stored automatically when a change to the structure of the software object is made, each of said change documents associates a change to the structure of the software object with a point in time at which the change was made; and
      instructions that, when executed by the processor in response to a request for the software object data content and structure content corresponding to a first point in time, the first point in time occurring in the past:
         determine a current software object data content and structure content;
         generate the software object data content and structure content at a point in time based upon the current software object data content and structure content and from change documents stored at or after the first point in time;
         create a temporary software object storing the generated software object data content and structure content; and
         display the generated data content and structure content stored in the temporary software object on the display device.

2. A system comprising:
   a display;
   a processor; and
   a computer-readable storage medium having stored thereon:
      a software object comprising data content and structure content, wherein the structure content represents a structure of the software object;
      a plurality of change documents representing a history of changes made to data content and the structure of the software object, wherein each of said change documents is stored automatically when a change to the structure of the software object is made, each of said change documents associates a change to the structure of the software object with a point in time at which the change was made; and
      instructions that, when executed by the processor in response to a request for the software object data content and structure content corresponding to a first point in time, the first point in time occurring in the past:
         determine a current software object data content and structure content;
         generate the software object data content and structure content at a point in time immediately following the first point in time based upon the current software object data content and structure content and from change documents stored at or after the first point in time;

create a temporary software object storing the generated software object data content and structure content; and display the generated data content and structure content stored in the temporary software object on the display device.

3. A system comprising:

a display;

a processor; and a computer-readable storage medium having stored thereon:

a software object comprising data content and structure content, the structure content represents a structure of the software object;

a plurality of change documents representing a history of changes made to data content and the structure of the software object, wherein each of said change documents is stored automatically when a change to the structure of the software object is made, each of said change documents associates a change to the structure of the software object with a point in time at which the change was made; and instructions that, when executed by the processor in response to a request for the software object data content and structure content corresponding to a point in time preceding the plurality of change documents associated with the software object:

determine a current software object data content and structure content;

generate the software object data content and structure at the point in time preceding the plurality of change documents associated with the software object based upon the current software object data content and structure content and the plurality of change documents;

create a temporary software object storing the generated software object data content and structure content; and display the generated data content and structure content stored in the temporary software object on the display device.

4. The system of claim 1, further comprising recording the temporary software object data content and structure content into a file stored on the computer-readable storage medium.

5. The system of claim 1, wherein the request expresses the first point in time as a length of time relative to a current point in time.

6. The system of claim 2, further comprising recording the temporary software object data content and structure content into a file stored on the computer-readable storage medium.

7. The system of claim 2, wherein the request expresses the first point in time as a length of time relative to a current point in time.

8. The system of claim 3, further comprising recording the temporary software object data content and structure content into a file stored on the computer-readable storage medium.

9. The system of claim 3, wherein the request expresses the point in time preceding the plurality of change documents associated with the software object as a length of time relative to the current point in time.

* * * * *